United States Patent
Watanabe et al.

(10) Patent No.: US 7,502,302 B2
(45) Date of Patent: Mar. 10, 2009

(54) OPTICAL RECORDING AND READING EQUIPMENT

(75) Inventors: Koichi Watanabe, Hachioji (JP);
Takahiro Kurokawa, Fujisawa (JP);
Masahiro Aoki, Kokubunji (JP);
Takeshi Shimano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 613 days.

(21) Appl. No.: 11/192,082

(22) Filed: Jul. 29, 2005

(65) Prior Publication Data
US 2006/0114777 A1    Jun. 1, 2006

(30) Foreign Application Priority Data
Nov. 26, 2004    (JP) ............................ 2004-341380

(51) Int. Cl.
*G11B 7/00*    (2006.01)
(52) U.S. Cl. ................ 369/116; 369/121; 369/53.27
(58) Field of Classification Search ................ 369/116, 369/121, 47.19, 53.26, 53.27
See application file for complete search history.

(56) References Cited

U.S. PATENT DOCUMENTS

| | | | | | |
|---|---|---|---|---|---|
| 4,051,329 | A | * | 9/1977 | Blondet et al. | 369/116 |
| 4,363,116 | A | * | 12/1982 | Kleuters et al. | 369/30.12 |
| 4,670,869 | A | * | 6/1987 | Chen | 369/112.05 |
| 5,936,992 | A | * | 8/1999 | Yamaguchi | 372/50.1 |
| 6,795,386 | B2 | | 9/2004 | Kobayashi | |

FOREIGN PATENT DOCUMENTS

| | | |
|---|---|---|
| JP | 2002-183970 | 12/2000 |
| JP | 2003229636 | 2/2002 |

* cited by examiner

*Primary Examiner*—Thang V Tran
(74) *Attorney, Agent, or Firm*—Reed Smith LLP; Juan Carlos A. Marquez, Esq.

(57) ABSTRACT

Disclosed herewith is a data recording and reading equipment capable of reducing laser noise easily. At first, a laser beam source that can reduce the laser noise when reading data from a subject optical disk is obtained. A modulator capable of varying laser attenuation with a voltage is disposed so as to precede the laser, thereby the laser noise when reading data from the optical disk can be reduced without lowering the laser power when in writing.

5 Claims, 14 Drawing Sheets

LASER NOISE (RIN) VS. LASER POWER

T: RESPONSE TIME FROM READING TO RECORDING

CHARACTERISTIC OF ELECTRO ABSORPTION
TYPE OPTICAL MODULATOR

CHARACTERISTIC OF ELECTRO ABSORPTION TYPE OPTICAL MODULATOR

PRIOR ART FIG.10

PHOTOCURRENT OF ELECTRO ABSORPTION
TYPE OPTICAL MODULATOR

OPTICAL RECORDING AND READING EQUIPMENT

CLAIM OF PRIORITY

The present application claims priority from Japanese application JP 2004-341380 filed on Nov. 26, 2004, the content of which is hereby incorporated by reference into this application.

FIELD OF THE INVENTION

The present invention relates to a data recording and reading equipment such as any of optical disk drives of CD-R, CD-RW, DVD-R, DVD-RW, DVD-RAM, Blu-Ray disk, and HD-DVD for driving/controlling laser beam waveforms when recording/reading data on/from data recording media.

BACKGROUND OF THE INVENTION

Such optical recording disk drives have all been expanded in capacity and CD drives using conventional infrared laser beams (wavelength: 780 nm), DVD drives using red laser beams (wavelength: 650 nm), and blu-ray disk drives (BD) and high density (HD) DVD drives using blue laser beams are already under manufacturing. In optical disk drives such as optical disk reading/recording drives as described above, each high frequency signal (read RF signals) read from an optical disk includes so-called laser noise generated from the beam irradiated on the optical disk. The characteristic of this laser noise do not differ so much between LSs of CD (wavelength: 780 nm) and DVD (wavelength: 650 nm), since compound semiconductor materials used for those disks, as well as their LD wavelengths are almost the same. In the case of the blue laser used for the next generation DVD drives, however, the characteristic of the LD comes to be different from that of the conventional ones, since a special compound semiconductor material referred to as GaN is used for the blue laser.

For example, the laser noise characteristic is represented as RIN (Relative Intensity Noise). According to the BD standard, this RIN is ruled as −125 dB/Hz or under. FIG. 2 shows a relationship between system noise and laser noise. The system noise is composed of all types of noise such as laser noise, amplification noise, etc. generated from the subject system. At present, the BD employs a one-time speed. In case the speed is improved to a 2-time speed or 4-time speed in the future, however, such system noise is required to be reduced and the main system noise, that is, laser noise is required to be further reduced as the operation of the BD is speeded up more and more.

When writing data into an optical disk drive, the required output value is 30 mW or over at present in case a blue laser is used. On the contrary, the blue laser power on the surface of the disk when in reading is ruled as 0.35 mW±0.1 by the BD standard. And, in order to satisfy the requirement, the output blue laser power when in reading is required to be 2 mW or under. The conventional blue laser cannot satisfy both of the requirements, that is, large output power and less noise generation with any ordinary methods that use the BD respectively.

In order to realize highly accurate data reading, there have been proposed some methods for removing laser noise from read RF signals. For example, the patent document 1 (JP-A No. 183970/2002) discloses a first multiplier 16-1 shown in FIG. 3, in which a read RF signal rf (t) is multiplied by a DC component of an APC monitor output signal m (t) output from an LPF 15 and the signal that is a result of the multiplication is supplied to a calculator 17. In a second multiplier 16-2, a read RF signal rf(t) is multiplied by a laser noise component of the APC monitor output signal m output from an HPF 18 and the signal that is a result of the multiplication is supplied to the calculator 17. And, in the calculator 17, the signal output from the multiplier 16-2 is reduced from the signal output from the multiplier 16-1 to remove both of the laser noise additive noise component and the modulation noise component. Each optical disk drive provided with a reading mechanism is designed to realize desirable reading.

The patent document 2 (JP-A No. 229636/2003) discloses a method that forms an attenuator for adjusting an optical output of the laser beam in a semiconductor laser element that includes a laser beam source for irradiating a laser beam onto a semiconductor substrate and a modulator for modulating the laser beam in the same laser structure as that of the laser beam source.

SUMMARY OF THE INVENTION

However, in the case of a method for canceling laser noise with use of a conventional circuit, the circuit configuration must be modified significantly. And, this comes to cause the system design to be complicated and the manufacturing cost to increase.

This is why there has been desired to realize a method that can cancel such laser noise without modifying the circuit configuration. FIG. 4 shows the characteristic of the RIN (Relative Intensity Noise) of blue lasers. As shown in FIG. 4, in case the beam power is low, the RIN increases. And, in case the beam power is high, the RIN decreases. The output beam power at the root of the LD goes down to 2 mW or under when in reading from an optical disk due to the beam output from the surface of the disk and the limited efficiency of the optical pick-up for using the beam. The conventional laser thus causes the RIN to goes over −125 dB/Hz, thereby the read signals are degraded in quality. As shown in FIG. 4, the RIN depends on the laser power so that the more the laser power increases, the more the RIN decreases. This phenomenon is used to reduce the laser noise when in reading from optical disks. It is assumed that the utility efficiency of the beam from LD output to disk surface is 25%. The LD output is 1.4 mW at a reading power of film surface 0.35 mW and the RIN goes over −125 dB/Hz at that time.

In this case, a filter is disposed so as to follow the output of the laser so that the filter functions to lower the transmissivity of the laser beam (50%) when in reading. Then, the laser output is increased while the reading power on the surface of the disk is set at 0.35 mW, thereby reducing the noise up to −125 dB/Hz that is a target value of the noise reduction. On the other hand, when in reading/erasing, the transmissivity of the filter is raised not to lower the power efficiency of the laser beam. When in reading and erasing, the laser beam output becomes larger than that when in reading, so that the laser noise problem as described above is ignorable.

A visible light filter such as a liquid crystal attenuator that is slow in response should not be used to avoid another problem occurrence. FIG. 5 shows a concept of the response time in a process from reading to recording. This liquid crystal attenuator requires about 50 ms for the response time of transmissivity switching. And, this response time, when it is 50 ms, comes to be equivalent to a time within which the subject disk rotates once. In case the laser beam power is not stabilized while the disk rotates once in a switching process from recording to reading or from reading to recording, it causes a problem of the deviation of the focusing servo. This focusing servo deviation is a serious problem that disable detection of disk positions, laser spot defocusing, etc. Those problems are thus required to be solved to employ any of such visible light filters.

Under such circumstances, it is an object of the present invention to provide a data recording and reading equipment capable of reducing the laser noise as described above easily and solving the above conventional response time problems.

In order to solve the above conventional problems, the present invention uses a modulator that modulates high speed signals in optical communications. In each optical fiber communication system, chirping of comparatively large waveforms comes to limit both transmission distance and modulation speed in direct intensity modulation by a laser diode. In case a signal light having chirping passes through an optical fiber having chromatic dispersion (wavelength dispersion), the waveform is usually distorted.

In order to avoid this problem, an external light modulator that does not cause chirping so easily is employed for optical communications. For example, it is reported that such an external light modulator is an MZ modulator that uses LiNbO3 crystal or compound semiconductor crystal. There is also an electro absorption type optical modulator (EA modulator) proposed as another external light modulator that can be driven with a power lower than that of the MZ modulator and can be reduced more in size than the MZ modulator. The EA modulator absorbs a carrier beam according to an applied voltage (see FIG. 6) to generate an intensity-modulated signal beam. For example, an EA modulator that uses compound semiconductor crystal is reported as such a modulator.

This practical EA modulator is provided as a semiconductor chip manufactured with a semiconductor laminating technique. The EA modulator is easily united with a laser diode used as a carrier beam source. Consequently, high output and size reduction can be realized by reducing the coupling loss between the carrier beam source and the modulator. For example, there is a report about an EA-DFB laser semiconductor chip obtained by uniting a DFB (Distributed Feed-Back)-LD (laser diode) with an EA modulator into one monolithically.

Hereunder, a general EA-DFB laser semiconductor chip will be described with reference to FIG. 7. FIG. 7 shows a configuration of the EA-DFB laser semiconductor chip in which a modulator and a laser are integrated. An output beam of this semiconductor laser element 10 is inputted to a modulator 11 disposed adjacently, then passed through a beam modulator 2 in the normal state. In case a high frequency modulation signal is applied to the laser element 10, the laser beam is transmitted/absorbed repetitively according to a signal voltage change to become high frequency beam signals.

In this case, modulation is made by the laser beam itself on the subject optical disk. A DC voltage is applied to the modulator to change the voltage between reading and writing. The response time at a power change from reading to writing in the modulator is also improved up to 40 Gb/s (response time: 15 ps, pico: $10^{-12}$) (see FIG. 8). And, because the modulator response time is lower enough than the rotation speed of the present optical disks that is limited at 10,000 rpm (revolutions per minutes (cycle: about 6 milliseconds, milli: $10^{-3}$), the modulator design can be modified without causing any problem to correspond to the laser power of those optical disks.

The present invention's equipment and method for reading and reading can thus configure an optical disk system with use of a laser having large laser noise. Especially, the present invention is effective for optical disk storage systems that use a laser of a wavelength 405 nm that has large laser noise respectively.

According to the present invention, therefore, it is possible to provide a data recording and reading equipment capable of reducing laser noise easily.

DETAILED DESCRIPTION OF THE PREFERRED EMBODIMENTS

Hereunder, the preferred embodiments of the present invention will be described with reference to the accompanying drawings.

First Embodiment

Figure 1:
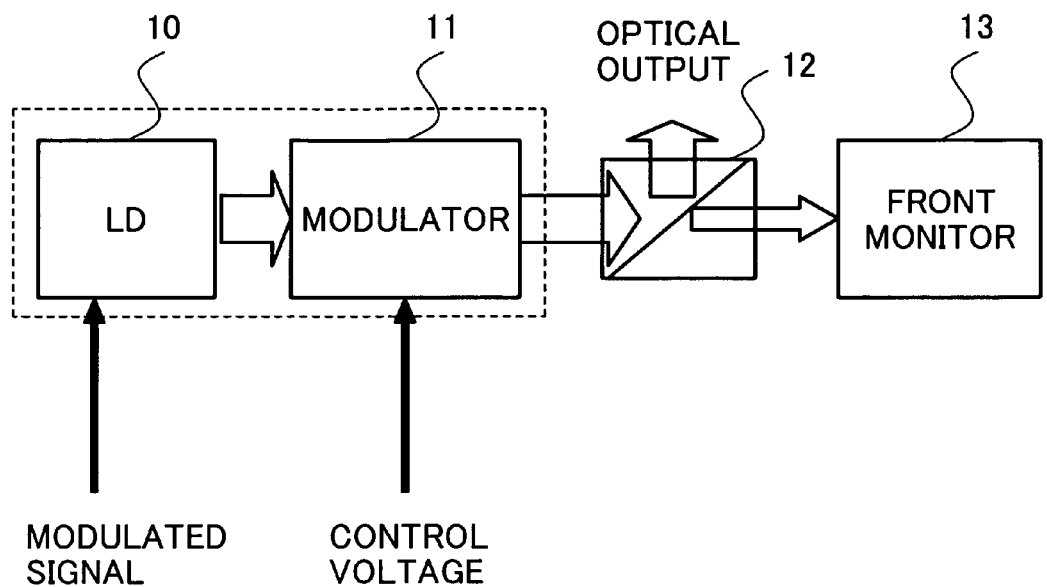
FIG. 1 is a block diagram of an optical pick-up of the present invention.
Figure 2:
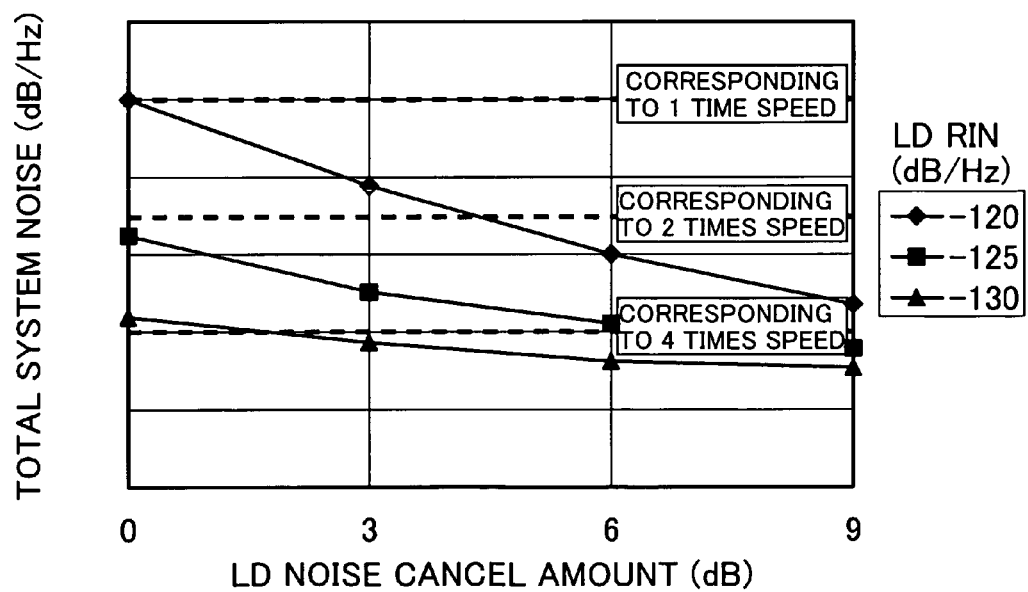
FIG. 2 is a relationship between laser noise and system noise.
Figure 3:
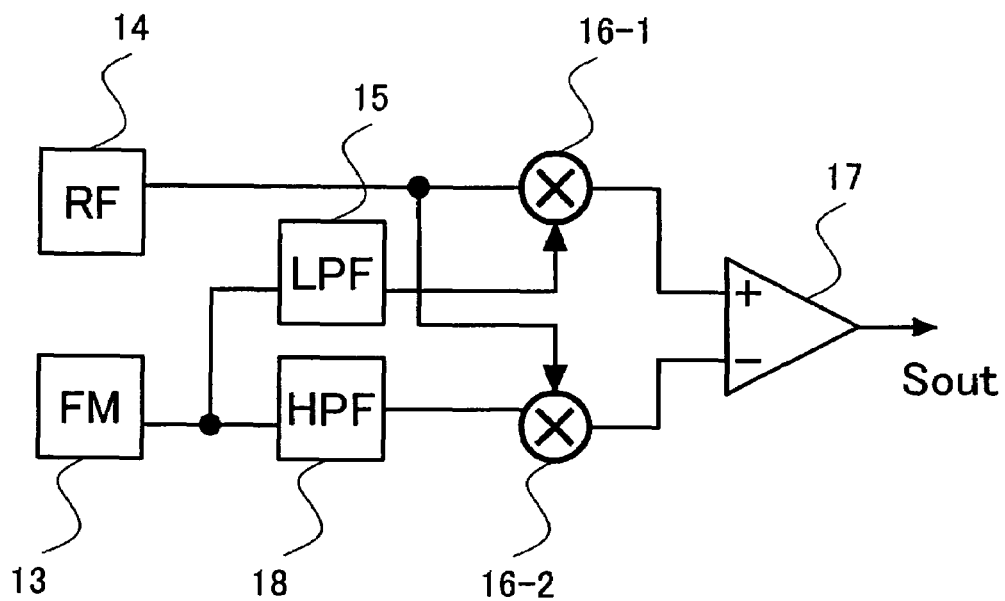
FIG. 3 is a block diagram of a circuit used for laser noise cancellation.
Figure 4:
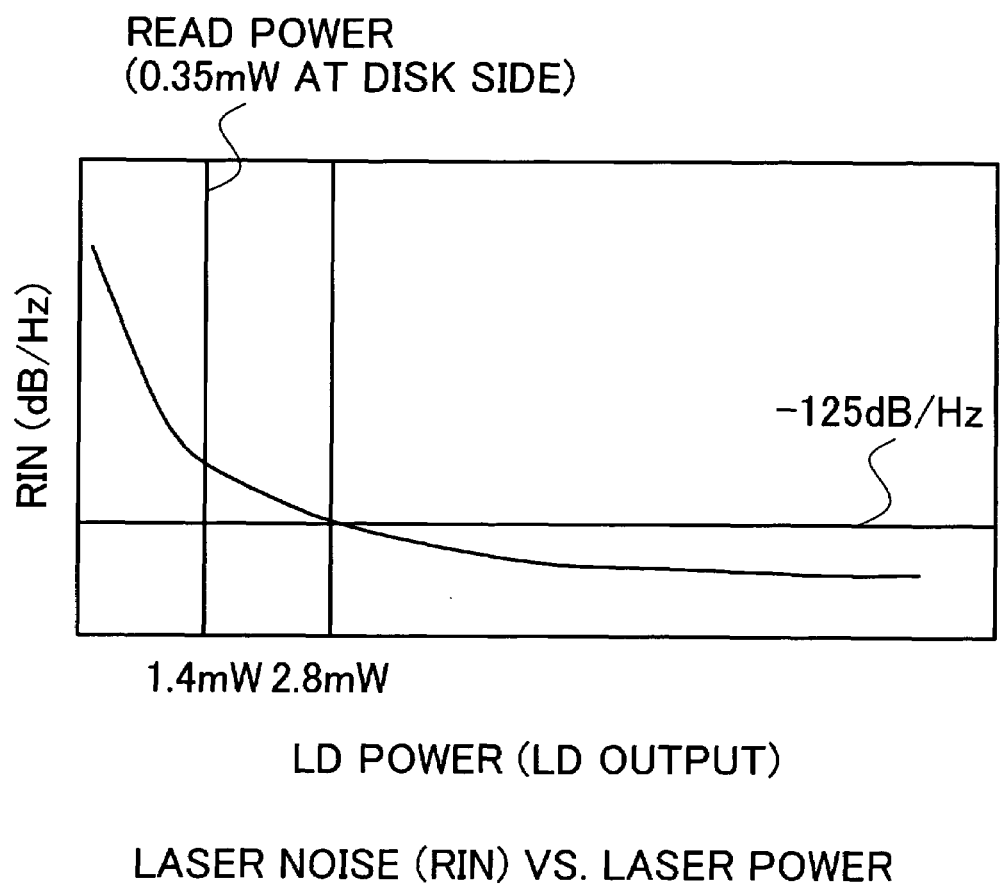
FIG. 4 is a graph for describing the dependency of laser noise on power.
Figure 5:
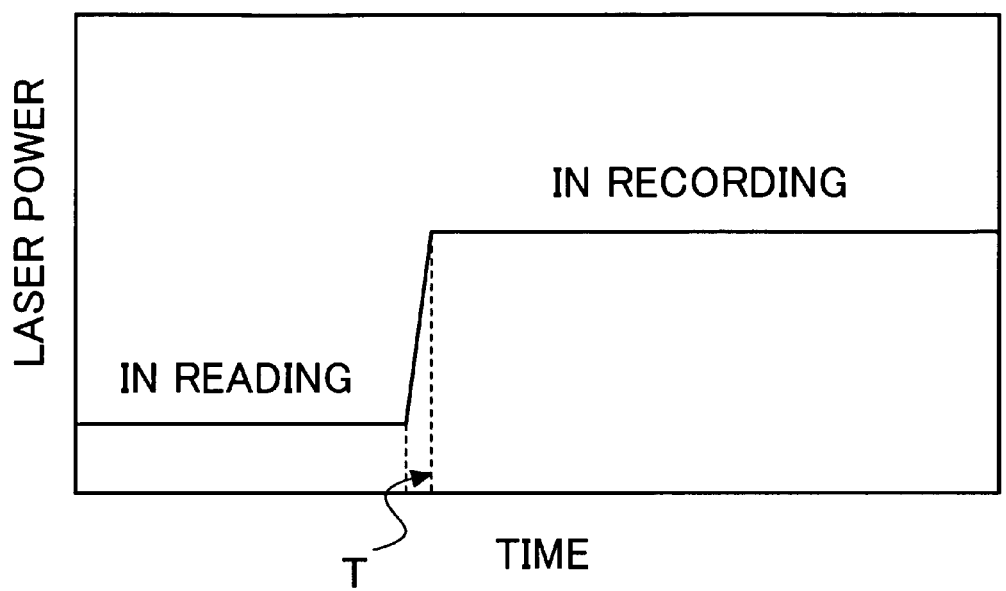
FIG. 5 is a graph for denoting a response time in power switching from reading to recording.
Figure 6:
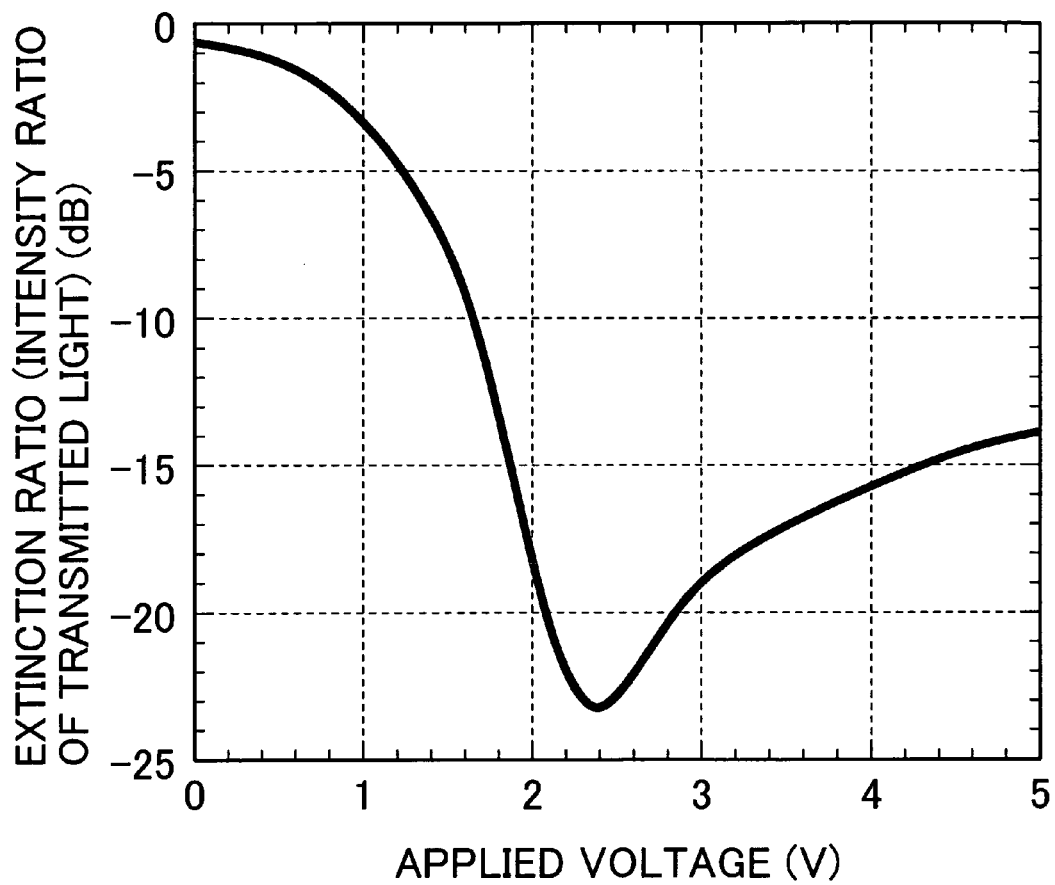
FIG. 6 is a graph for denoting a relationship among voltages applied to the modulator and beam-off ratios.
Figure 7:
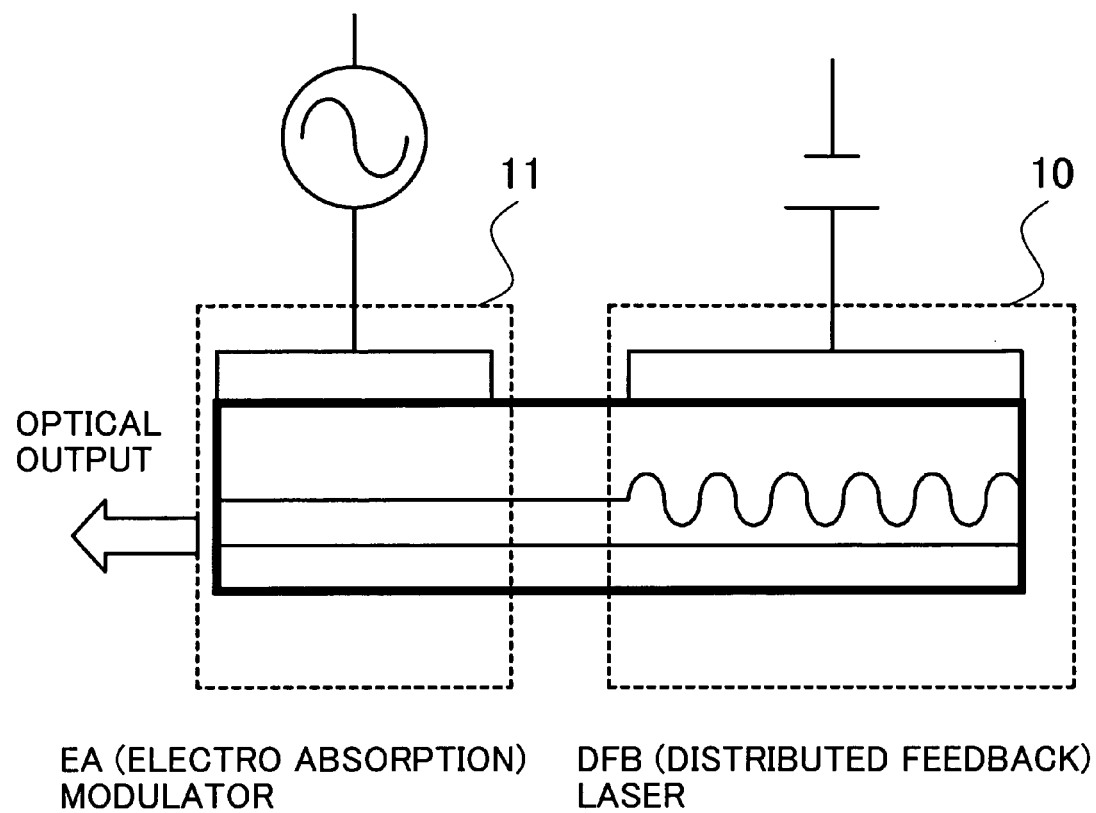
FIG. 7 is a relationship between a circuit configuration in which a laser and a modulator are integrated to be used for optical communications and signals to be provided by the configuration.
Figure 8:
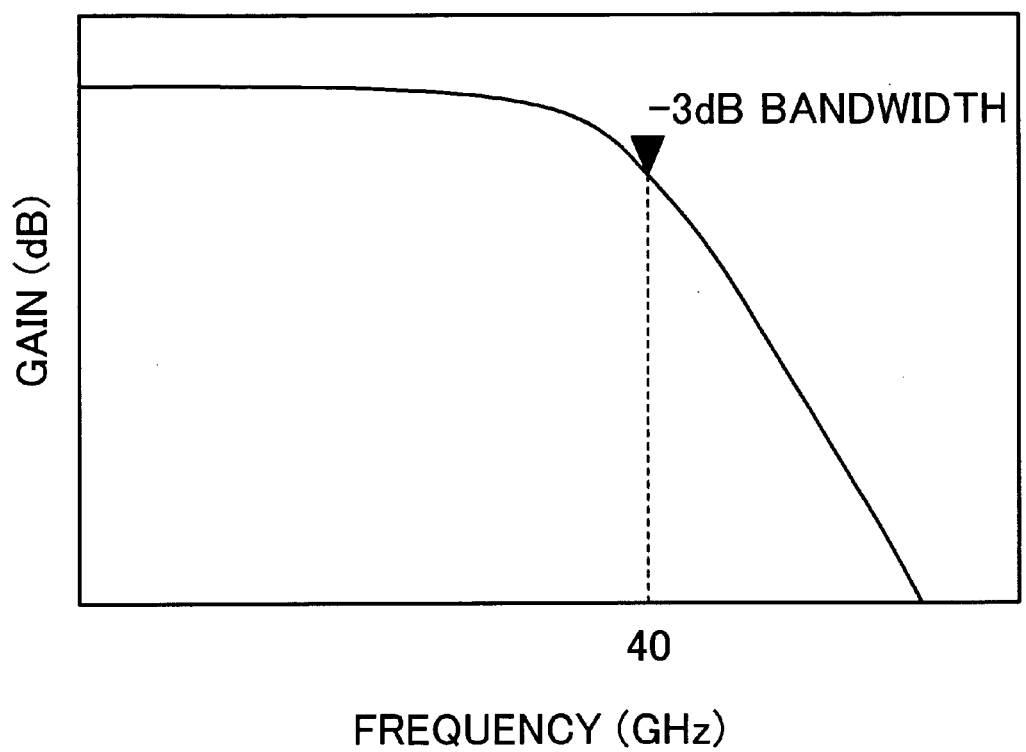
FIG. 8 is an example of frequency characteristic of the modulator.

At first, a description will be made for an optical disk system that uses a laser disposed so as to precede a modulator in the first embodiment with reference to FIG. 1. The value of the noise level (RIN) is lowered up to a level required by the system when in reading. At that time, a laser output power with which the required RIN value is reached is set and the attenuation value of the modulator disposed preceding the laser is controlled with a voltage so that the attenuation reaches the specified 0.35 mW on the surface of the subject disk. In the BD standard, correspondence to two-layer disks is also ruled. The reading power of the 2-layer disks is set at 0.7 mW. More concretely, in this semiconductor laser element, the beam output from the beam source is inputted to the modulator 11 disposed adjacently. When in recording and erasing, no voltage is applied to the modulator 11 so that the beam passes through the modulator 11 as much as possible.

When in reading, a voltage is applied to the modulator 11 so that the laser beam is absorbed in the modulator 11 to be attenuated. After that, optical signals are passed through a beam splitter 12 so that the laser beam is irradiated on the subject optical disk as shown in FIG. 1. On the other hand, the laser beam irradiated from the modulator 11 passes through the beam splitter 12 to be supplied to a front monitor 13 (photo-detector) and converted to electric signals. The signals output from the photo-detector are APC monitoring signals used to adjust the laser beam power (intensity) automatically. Then, the gain is adjusted in the monitor, then used as APC (Auto Power Control) monitor output signals.

Second Embodiment

Figure 9:
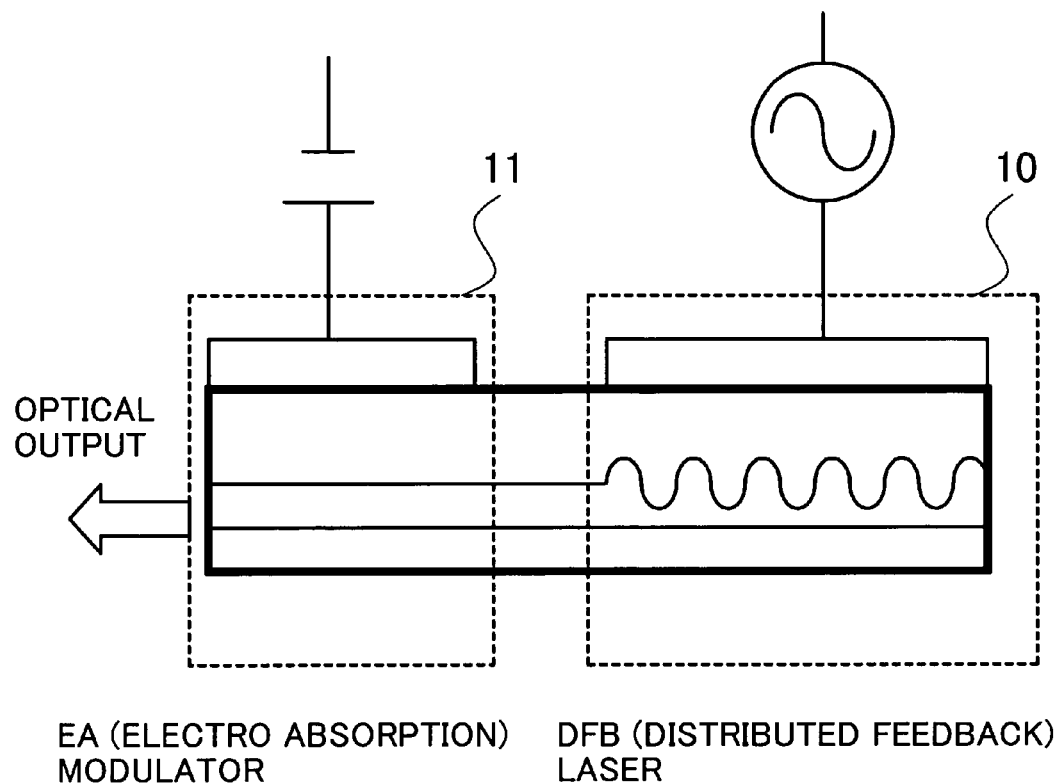
FIG. 9 is a relationship between a circuit configuration in which a laser of the present invention and a modulator are integrated to be used for optical communications and signals to be provided by the configuration.

FIG. 9 shows the second embodiment. Basically, the same items as those in the first embodiment will be omitted here. In this second embodiment, a semiconductor chip in which a modulator and an LD are integrated is used. This is only a difference from the first embodiment. In case an electro absorption type modulator is used, the laser can also be integrated in the semiconductor chip as to be described below. This integration is effective to reduce the semiconductor chip in size significantly. Slim-sized disk drives have been required to be developed for optical disks of PCs, particularly for lap-top PCs. Those compact-sized disk drives will thus come to be reduced in size more and more indispensably to enable compatibility among CD, DVD, and BD. In case the modulator is to be installed separately in the semiconductor chip, the modulator package should also be integrated in the semiconductor chip so as to enable the chip to be manufactured easily.

In this case, the laser noise can be eliminated just like in the first embodiment.

Third Embodiment

Next, the third embodiment of the present invention will be described with reference to FIGS. 10 through 12. In this third embodiment, high speed APC is realized and the laser power is actually controlled by a modulator.

At first, the APC will be described briefly. FIG. 10 shows a conventional configuration of the APC. The APC is roughly divided into two portions; so-called reading power APC performed when reading data from the subject optical disk and writing APC performed when writing data into the optical disk. The reading APC is performed to keep the reading laser power at 0.35 mW in a state of high frequency superposition (400 MHz for BD). The writing APC is performed to fix the writing laser power while data is recorded with waveforms referred to as strategy, which is specific to optical disks.

Figure 10:
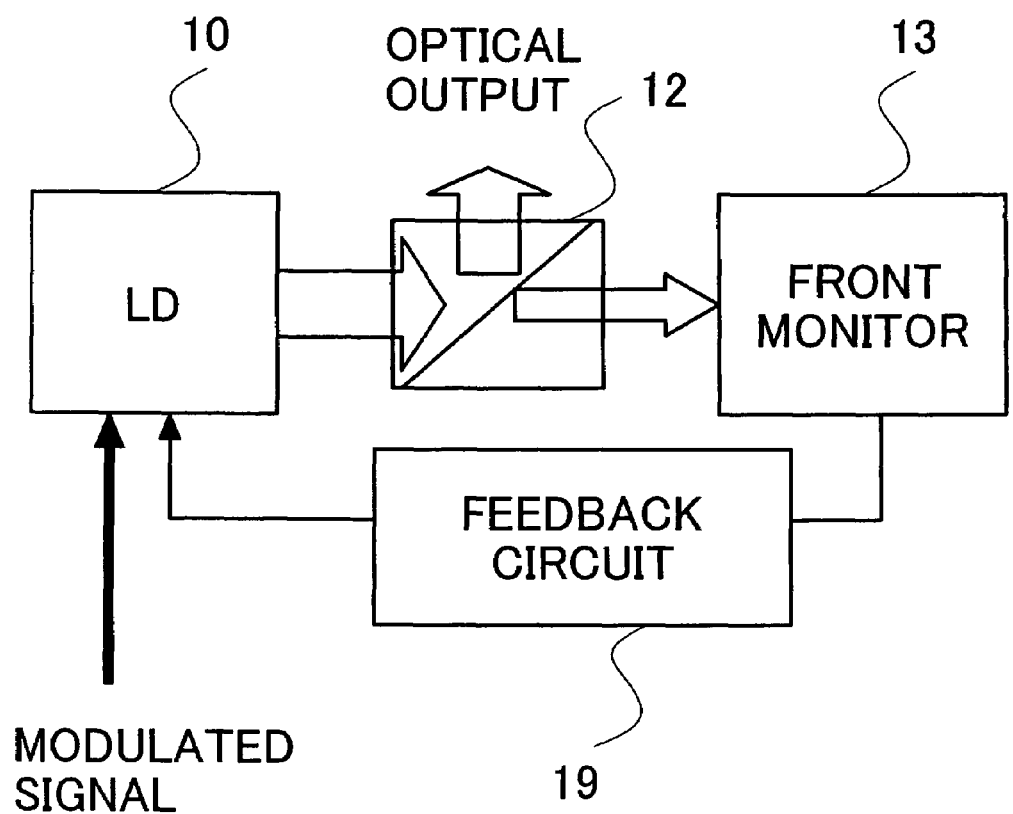
FIG. 10 is a relationship between a configuration in which a conventional laser and a modulator are integrated and signals to be fed back for APC.

Those APC operations are realized by monitoring the optical output power at a front monitor 13 as shown in FIG. 10 and feeding back the output power to an LD driver. The reading APC operation is performed with causing no problem by monitoring a fixed output power, but the reading APC operation is required to be performed by taking consideration to the strategy for monitoring the output power, thereby a wide bandwidth is needed for the reading APC operation. In addition, because the output power is required to be feed back quickly from the front monitor 13, a wide bandwidth is also required for a feedback circuit 19 in the configuration shown in FIG. 10. In such a wide bandwidth, the amplifier is apt to generate large noise and the noise in the laser driving circuit comes to increase, resulting in an increase of laser noise. This is why the conventional writing APC is difficult to cope with such an increase of laser noise as optical disks are improved more and more in operation speed.

Figure 11:
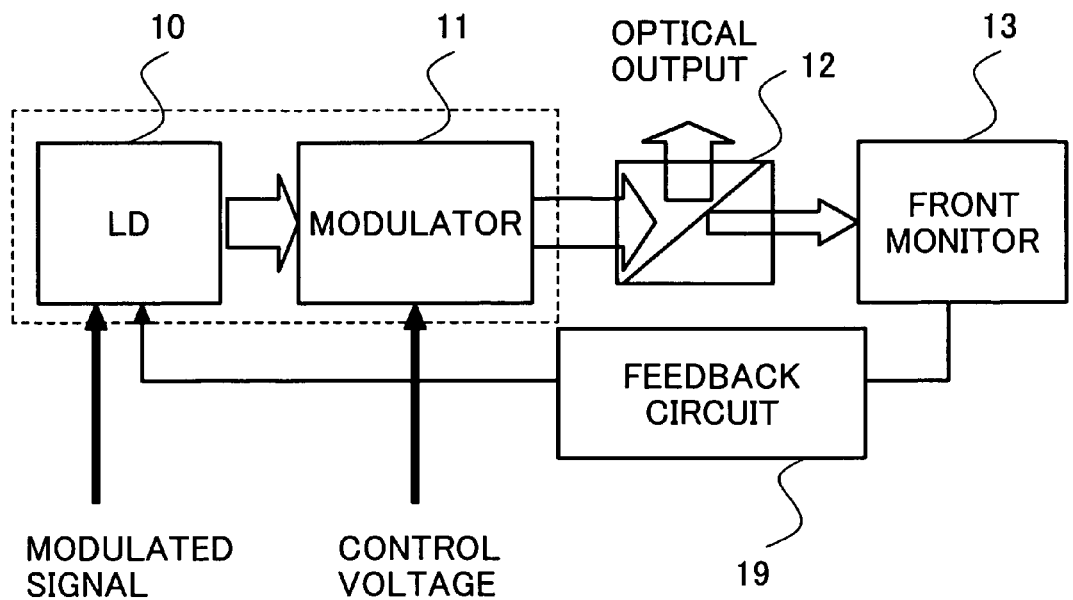
FIG. 11 is a circuit diagram for feeding back information to a laser with use of a signal from the front monitor according to a laser noise reduction method of the present invention.
Figure 12:
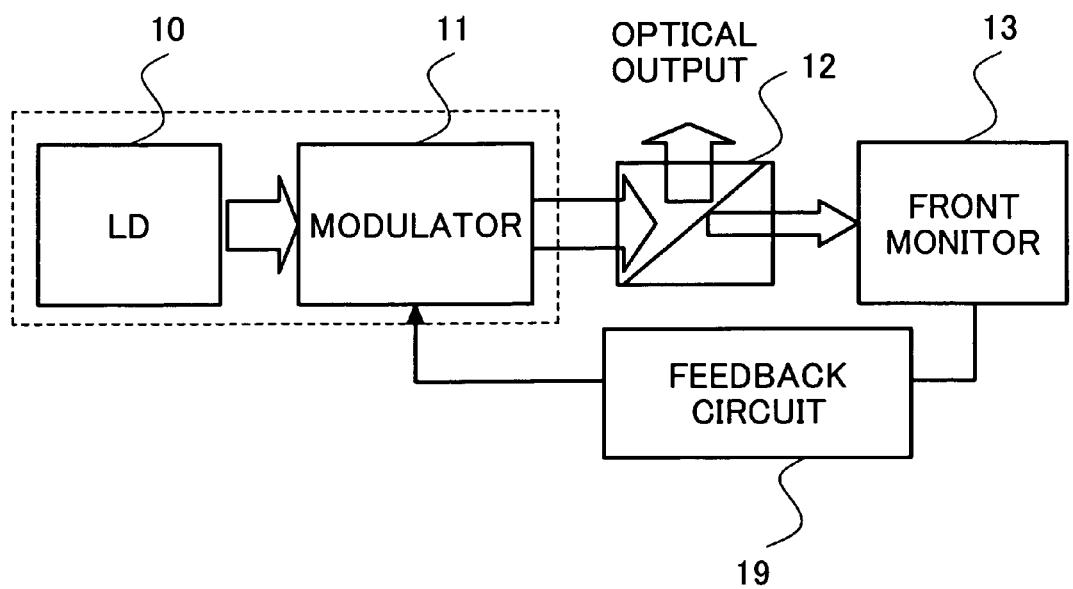
FIG. 12 is an example of fixing laser power by controlling the attenuation of the modulator with a signal received from a front monitor with use of a laser noise reducing method of the present invention in the third embodiment.

The same problem also occurs even in a laser noise reduction method that uses a modulator as shown in FIG. 11 in case the monitored output power is fed back to the LD driver. However, in case the modulator is used for APC operations as shown in FIG. 12, the writing APC can be performed at a high speed without increasing laser noise, although the APC performed by a modulator has been a bottleneck in high speed writing APC. As described above, the modulator operation speed is realized up to 40 Gb/s (response time 25 picoseconds: pico: $10^{-12}$). In case the window width at a regular speed of BD is about 15 ns (nanosecond: $10^{-9}$), this response speed comes to be able to correspond to the 12-time speed of BD (window width: about 1.2 ns) even when the BD rotation speed is to be improved up to a limit (10,000 rpm) in the future.

Fourth Embodiment

Figure 13:
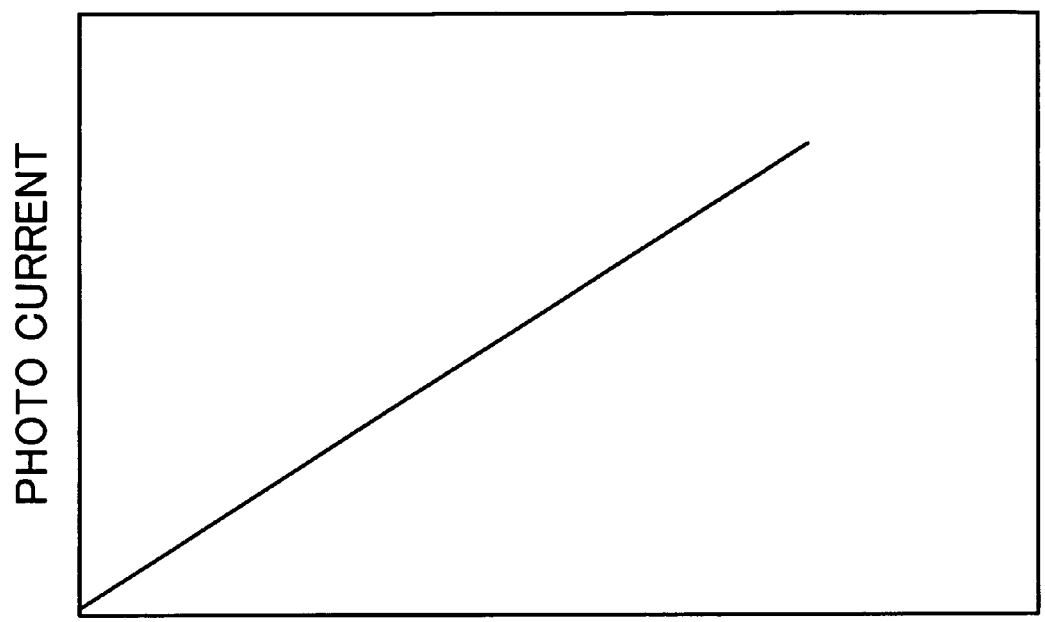
FIG. 13 is a relationship between photo-current and absorbed beam amount in an electro absorption type modulator.
Figure 14:
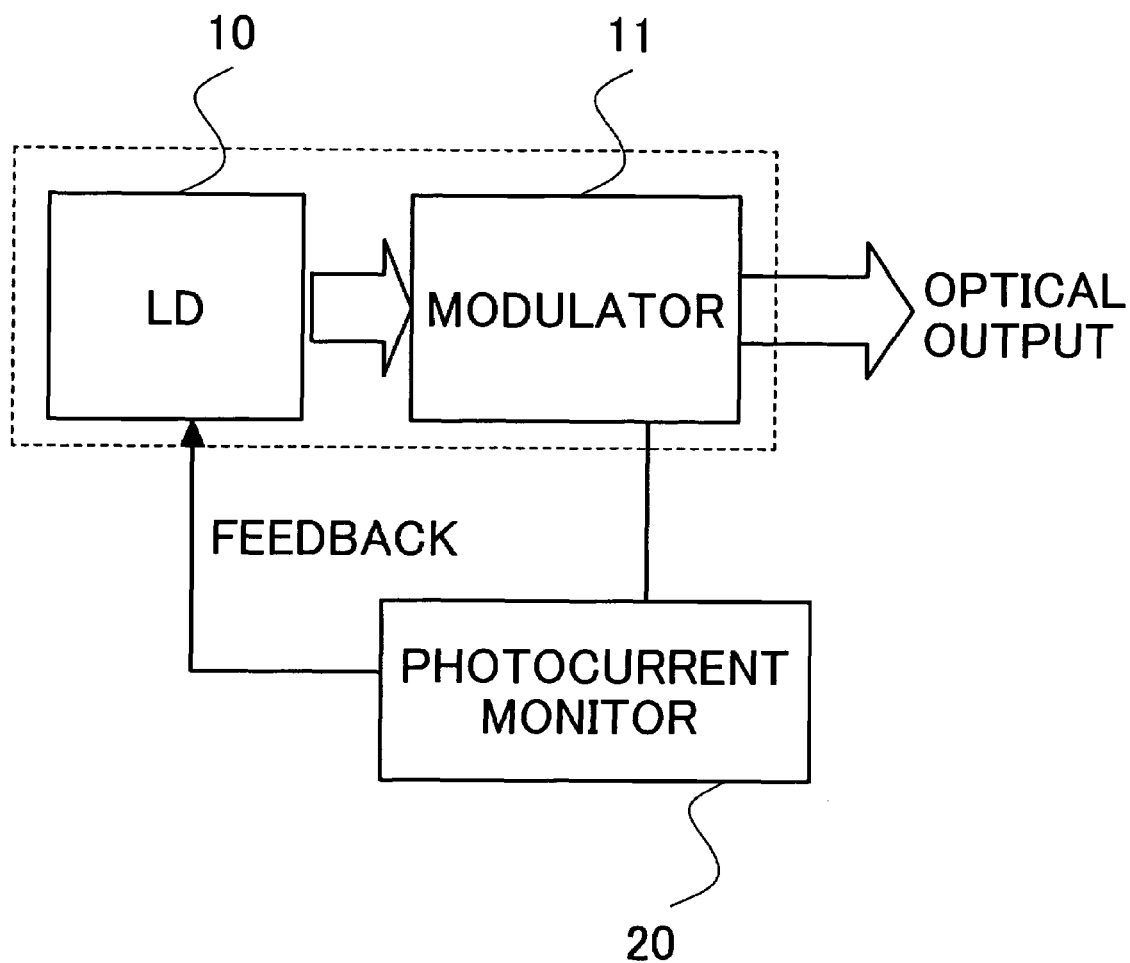
FIG. 14 is an example of monitoring the photo-current of the electro absorption type modulator in the fourth embodiment to use the monitored photo-current to feed back the laser power.
Figure 15:
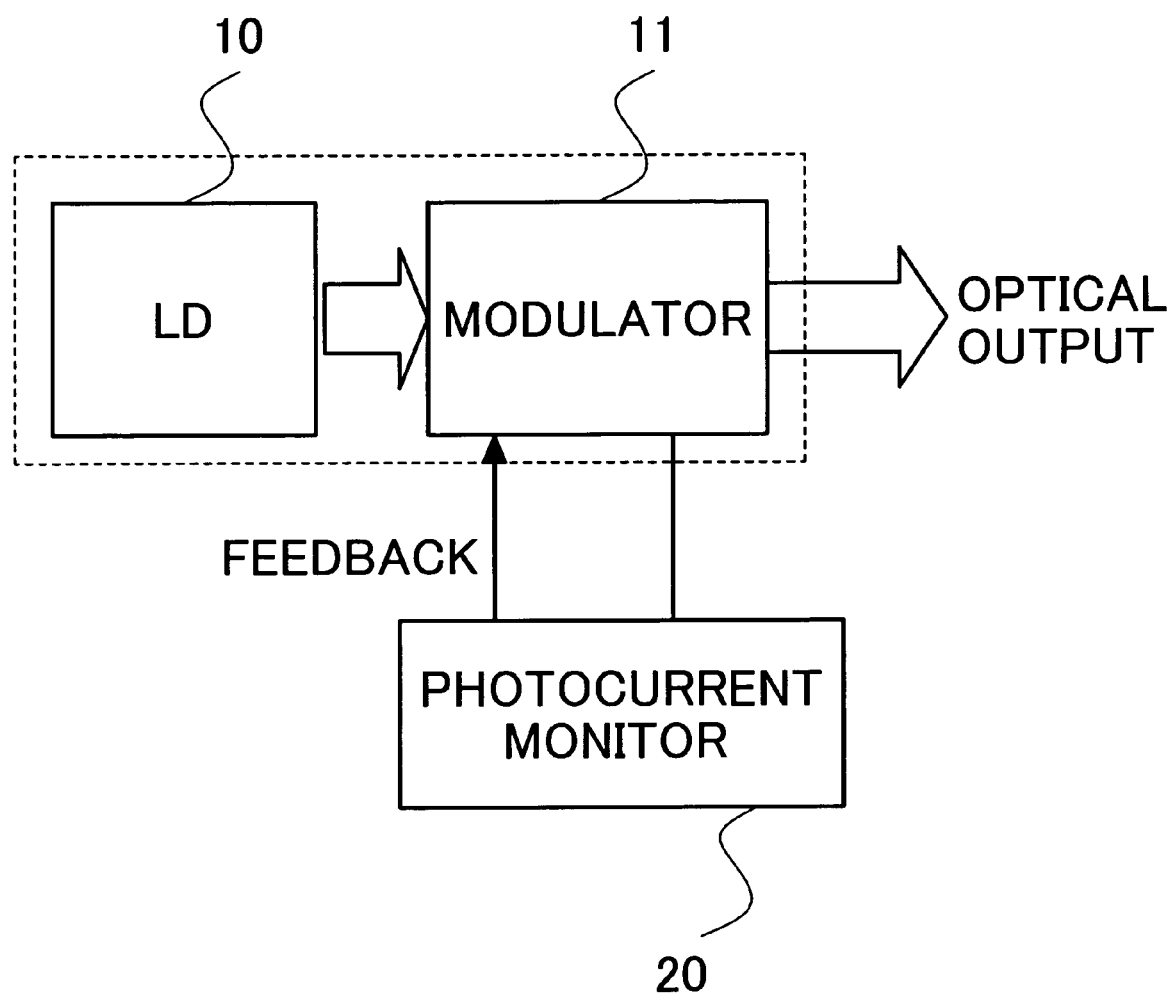
FIG. 15 is an example of monitoring the photo-current of the electro absorption type modulator in the fourth embodiment to feed back the photo-current to the voltage applied to the modulator.

Next, the fourth embodiment of the present invention will be described with reference to FIGS. 13 through 15. In case an electro absorption type modulator is used, a photo-current is generated according to the absorption amount in the modulator as shown in FIG. 13. This photo-current is observed to know a laser power variation as a change of the absorption. This technique is used instead of the front monitor used for the APC mainly in the third embodiment. FIGS. 14 and 15 show configurations of this fourth embodiment. In FIG. 14, the modulator photo-current signal is fed back to the laser (driving circuit). In FIG. 15, the signal is feed back to the voltage applied to the modulator. Because of those configurations, the modulator can be used effectively for two functions; laser noise reduction and front monitoring.

Fifth Embodiment

Figure 16:
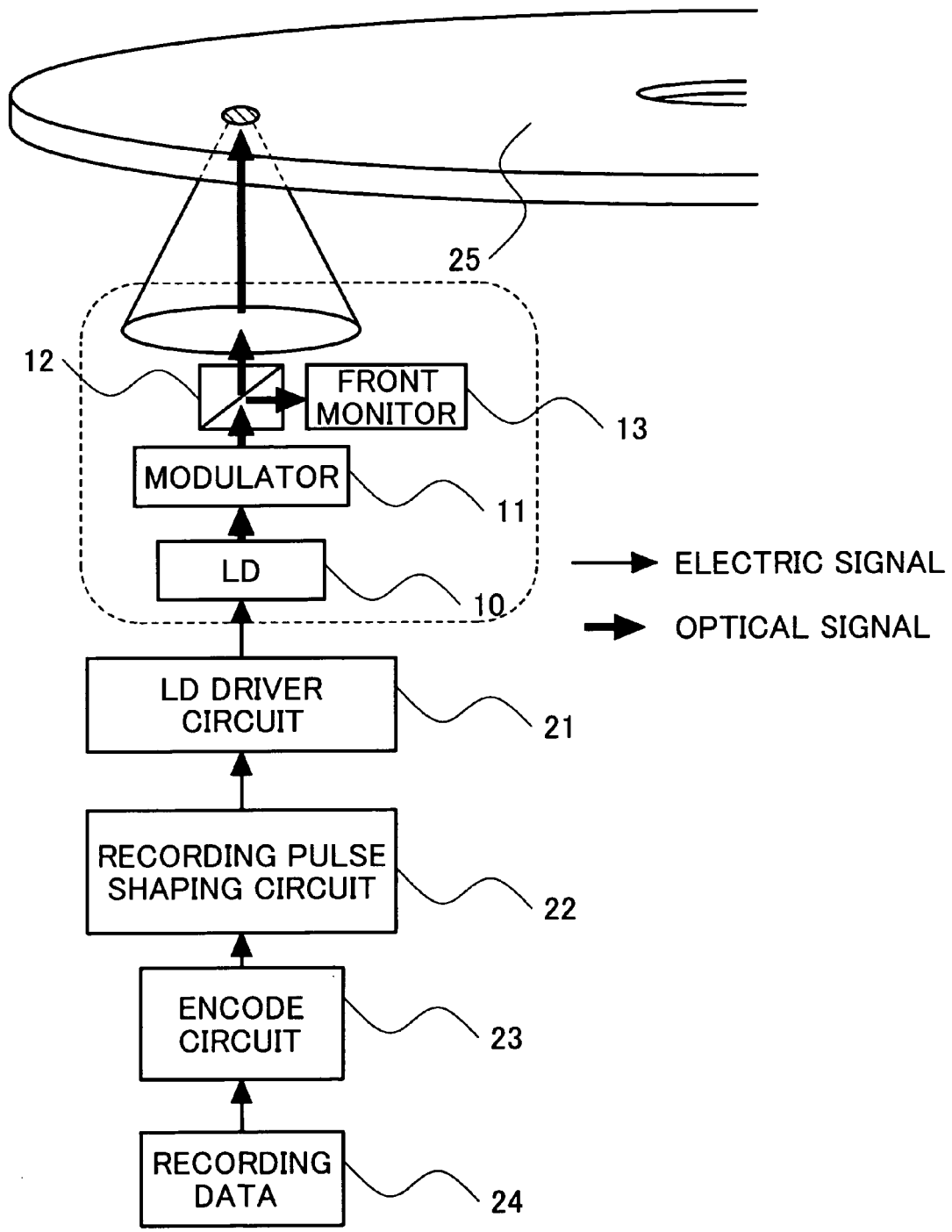
FIG. 16 is an example of an optical disk recording unit in which a modulator in the fifth embodiment is disposed so as to precede the laser.

Next, the fifth embodiment of the present invention will be described with reference to FIGS. 1 and 16. At first, how to record data will be described. As shown in FIG. 16, data 24 is encoded in an encoding circuit 23 and converted to signals for forming strategy used to write encoded signals on the subject disk in a recording pulse shaping circuit 22. The output of the recording pulse shaping circuit 22 is inputted to an LD driver circuit 21 to drive the LD 10, thereby a beam is emitted from the LD 10. At that time, no voltage is applied to the modulator to pass the laser beam as mush as possible. After that, laser beam signals are irradiated on the optical disk through a beam splitter 12 as shown in FIG. 16. This laser beam writes data in a recording medium 20. On the other hand, the laser beam irradiated from the modulator is also supplied to the front monitor 13 (photo-detector) through the beam splitter 12 and converted to electric signals therein. Basically, the recording operations described above are the same as erasing operations.

When reading data from a subject optical disk, a voltage is applied to the modulator, thereby the laser beam is absorbed and attenuated in the modulator. How much the laser beam is attenuated at that time is determined by a potential applied to the modulator enough to achieve the required attenuation with respect to the laser power set beforehand to lower the required laser noise (RIN) level calculated from the system design. This is why the present invention can build up a system that can lower the RIN level while satisfying the specified laser power (0.35 mW for one laser of BD) on the disk surface.

While the preferred form of the present invention has been described, it is to be understood that modifications will be apparent to those skilled in the art without departing from the spirit of the invention.

What is claimed is:

1. A data recording and reading equipment, including:
    a laser for irradiating a beam onto a data recording medium;
    a laser driver that supplies to the laser a modulated signal so that the laser emits a beam in accordance with the data to be recorded in the recording medium; and
    a modulator that changes an attenuation degree of the emitted beam by said laser in accordance with a control voltage,
    wherein, in reading, said data recording and reading equipment controls laser power so as to reduce a laser noise to a desired value or less, and controls the control voltage applied to the modulator so that beam power of the laser on a surface of the recording medium satisfies a value specified by a standard.

2. The data recording and reading equipment according to claim 1,
    wherein said laser and said modulator are united into one on one substrate.

3. The data recording and reading equipment according to claim 1,
    wherein said laser is 800 nm or lower in wavelength.

4. The data recording and reading equipment according to claim 1,
    wherein said modulator is any of an electro absorption type modulator, an optical modulator, and a Mach-Zehnder modulator.

5. The data recording and reading equipment according to claim 1,
    wherein said equipment further includes:
    a monitor for receiving a beam output from said modulator; and
    adjusting means for adjusting said power of said laser or said modulator according to a level of said beam recognized on said monitor.

* * * * *